Patented Aug. 23, 1927.

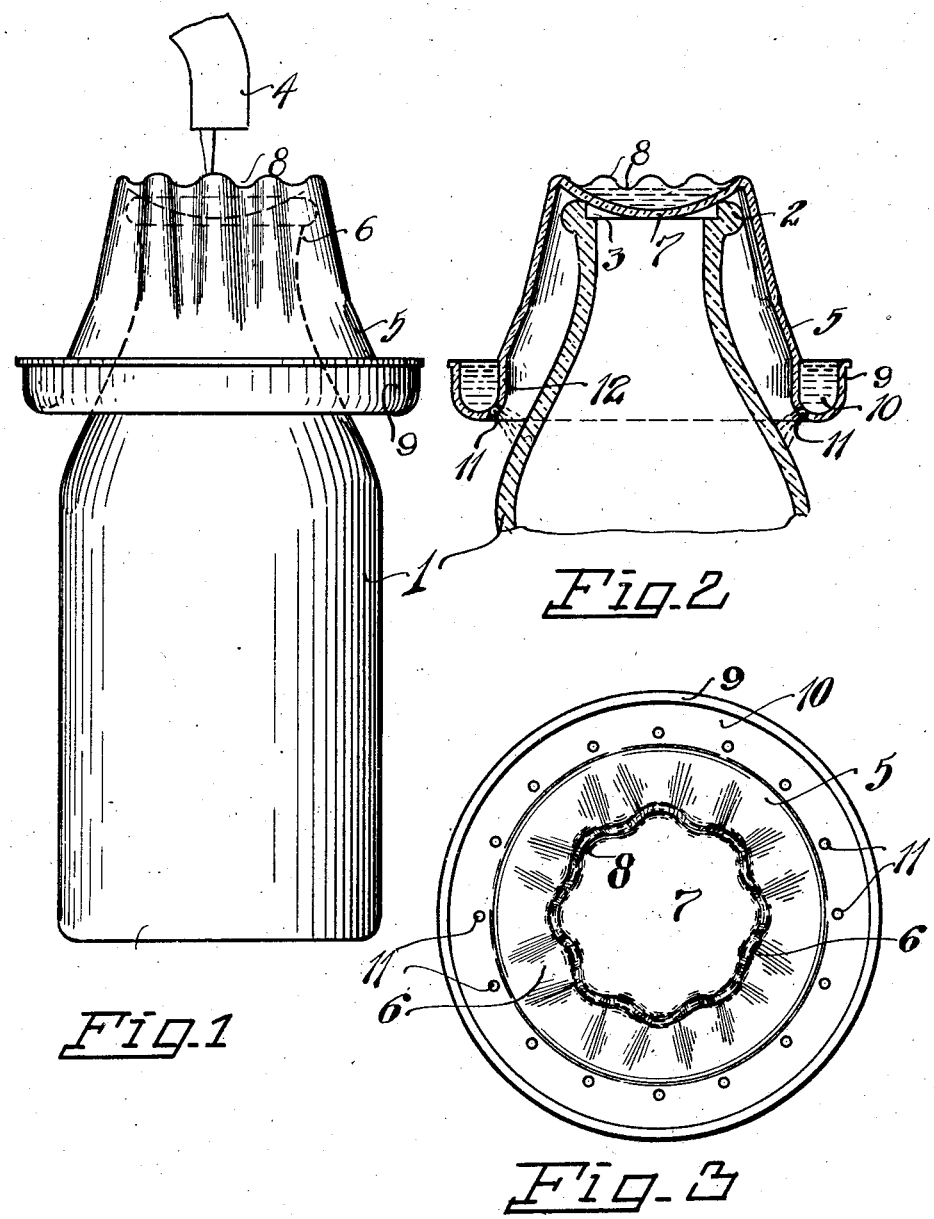

1,639,857

UNITED STATES PATENT OFFICE.

WILLIAM PLANSKI, OF KELLOGG, IDAHO.

BOTTLE COOLER.

Application filed June 28, 1926. Serial No. 119,117.

My present invention relates to improvements in bottle coolers or refrigerators of the type employing a non-porous receptacle applicable for use with a bottle, as a milk bottle, and having means for applying water to the outside of the bottle for evaporation and consequent cooling of the bottle walls and contents of the bottle.

The cooler is designed for use with a faucet or nozzle receiving water from a suitable source of supply, and from which nozzle or faucet the water may drip to provide a continuous supply to the cooler. The cooler is adapted to be removably supported upon the top of the milk bottle or similar article and is fashioned with a receiving reservoir and distributing trough for supplying the water to the exterior or outside of the bottle or receptacle to be cooled.

The cooler is preferably fashioned as an integral article of manufacture from pressed sheet metal, and may be manufactured at low cost of production in large quantities, to provide a sanitary and durable device of this character. The invention consists in certain novel combinations and arrangements of parts in the one-piece cooler as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation showing one of the coolers applied to a milk bottle and illustrating its relation to a drip-faucet or nozzle.

Figure 2 is a vertical sectional view through the cooler and the top of a milk bottle.

Figure 3 is a top plan view of the cooler.

In order that the general arrangement and relation of parts may readily be understood I have indicated a standard type of milk bottle as 1 having the usual annular top bead 2 and annular recess 3 for the bottle cap or closure. The cooler is adapted to be seated on the top of the bottle and to receive water as it drips from a faucet, nozzle, or other device indicated as 4 and receiving water from a suitable supply.

The bottle cooler is preferably fashioned in suitable machines or by suitable tools from sheet metal, with a tapering body 5 in the form of a truncated cone of sufficient size to enclose the top of the milk bottle as indicated in Figures 1 and 2. The walls of the body are fashioned with corrugations 6, and a concavo-convex top 7 is provided for the body with a corrugated edge 8. As seen in Figure 2 the concavo-convex top is adapted to seat in the recessed top of the milk bottle to form a stable support for the cooler on the bottle, and the concave portion of the top forms a receiving reservoir for the water dripping from the faucet or nozzle 4.

From the receiving reservoir the water runs or flows over the corrugated edge surrounding the reservoir and down the corrugated, tapered or conical body of the cooler, which forms courses for directing the flow of water from the reservoir, down the outer face of the body of the cooler. At its lower end the cooler is fashioned with an up-turned, annular flange 9 that provides an annular trough 10, spaced a suitable distance from the milk bottle which it surrounds. An annular series of perforations 11 is provided in the bottom of the trough adjacent the straight or vertical wall 12 formed at the lower end of the tapered body portion. The series of perforations is located in such position as to direct the water flowing therethrough against the outside of the milk bottle as indicated in Figure 2.

With the cooler applied to the bottle and placed under a nozzle or faucet as indicated in Figures 1 and 2 a continuous flow of water from the drip faucet or nozzle is provided to the reservoir in the top of the cooler, and the water which overflows through the corrugations 8 in the upper edge of the cooler passes down to the distributing trough 10 from whence it is directed to the outside of the bottle. As the water flows down the sides of the bottle the walls and contents of the bottle are cooled by evaporation in well known manner.

The cooler may be removed from its seat when not required and may be washed or cleansed at intervals to maintain it in a sanitary condition for use as a temporary closure for the milk bottle after the usual cap or disc has been removed therefrom.

It will be apparent that the minimum number of parts and simplicity of construction of the cooler permit access to its various parts for cleansing, thus insuring a sanitary article for domestic use.

Having thus fully described my invention, what I claim as new and desire to secure by Letters Patent is—

A bottle cooler comprising a body of truncated cone shape and having a concavo-convex top forming a receiving reservoir and adapted to be seated in the recessed top of a bottle, said body adapted to surround a portion of the bottle, an annular turned up flange forming a trough at the lower edge of the body having perforations therein for the purpose described.

In testimony whereof I affix my signature.

WM. PLANSKI.